United States Patent [19]

Laube et al.

[11] Patent Number: 4,955,538

[45] Date of Patent: Sep. 11, 1990

[54] APPLICATOR AND METHOD FOR THE DELIVERY OF GRANULAR AND LIQUID PRODUCTS TO TURF AREAS

[75] Inventors: Mark E. Laube, Copley; J. Martin Erbaugh, Hudson, both of Ohio

[73] Assignee: Erbaugh Corporation, Hudson, Ohio

[21] Appl. No.: 416,917

[22] Filed: Oct. 4, 1989

[51] Int. Cl.$^5$ ...................... A01C 15/00; A01C 19/04; B05B 1/20

[52] U.S. Cl. ........................................ 239/1; 239/165; 239/168; 239/170; 239/289; 239/651; 239/663

[58] Field of Search ............... 239/663, 651, 662, 687, 239/289, 163, 164, 165, 166, 167, 169, 170, 1, 302, 447, 11

[56] References Cited

U.S. PATENT DOCUMENTS

| | | | |
|---|---|---|---|
| 3,344,993 | 10/1967 | Wilder et al. | 239/164 |
| 3,401,890 | 9/1968 | Middlesworth | 239/167 |
| 3,556,404 | 1/1971 | Walker | 239/167 |
| 4,185,782 | 1/1980 | Belrose | 239/663 |
| 4,252,274 | 2/1981 | Kubacak | 239/170 |
| 4,281,780 | 8/1981 | Lagani, Jr. | 222/610 |
| 4,352,463 | 10/1982 | Baker | 239/663 |
| 4,483,486 | 11/1984 | Magda | 239/663 |
| 4,798,325 | 1/1989 | Block | 239/663 |
| 4,854,503 | 8/1989 | Little et al. | 239/166 |

FOREIGN PATENT DOCUMENTS 3144309  5/1983  Fed. Rep. of Germany ...... 239/167

OTHER PUBLICATIONS

"The Inventor's Story," Walkover Sprayers—Brochure.

Primary Examiner—Andres Kashnikow
Assistant Examiner—Michael J. Forman
Attorney, Agent, or Firm—Renner, Kenner, Greive, Bobak, Taylor & Weber

[57] ABSTRACT

An applicator for the delivery of dry and liquid materials to turf areas. The applicator (10, 180) comprises frame means (11) supported by ground engaging wheels (14, 15); hopper means (12) carried by the frame for holding the dry materials; sealed reservoir means (39, 181) carried by the frame for holding the liquid materials; impeller means (23) beneath the hopper and rotatably driven to broadcast the dry materials in an arc laterally outside of and in front of the wheels; means (125) for selectively controlling the application of the dry materials; extendible boom means (75) carried by the frame means; pump means (56) for pressurizing the liquid materials to produce a low volume, low pressure spray; first nozzle means (64) located beneath the impeller, in communication with the pump means; second nozzle means (65) carried by the boom means in communication with the pump means; means (130) for selectively activating the flow of liquid material from the pump means; sensing means (135) for independently controlling the flow of the liquid materials through the second nozzle means; and electrically operable valve means (151) for independently controlling the flow of the liquid materials through the second nozzle means. A method for uniform and simultaneous delivery of dry and liquid materials to turf areas can be practiced for continuous and intermittent application of liquid spray during application of dry materials.

25 Claims, 9 Drawing Sheets

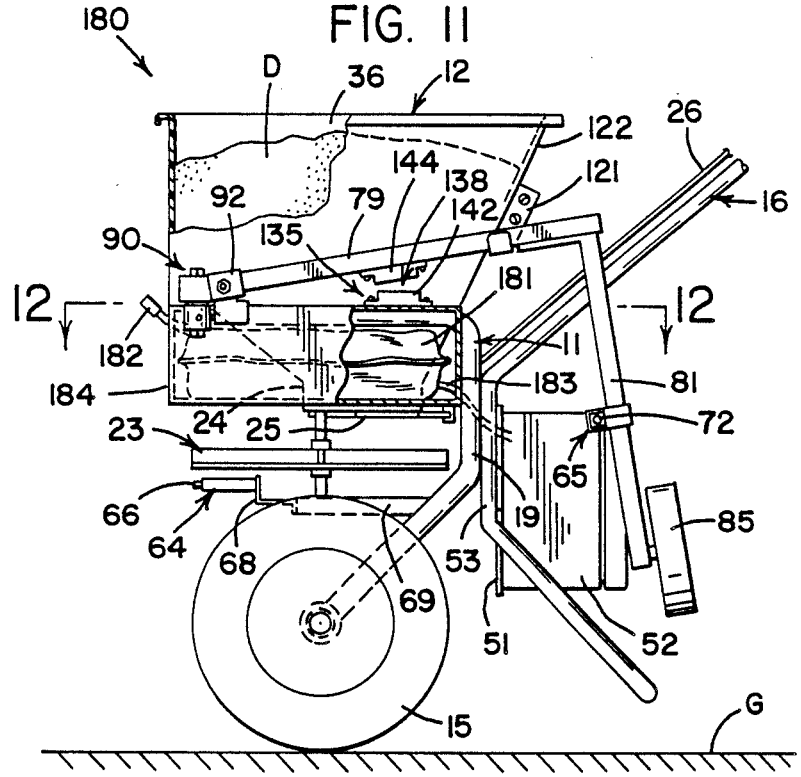
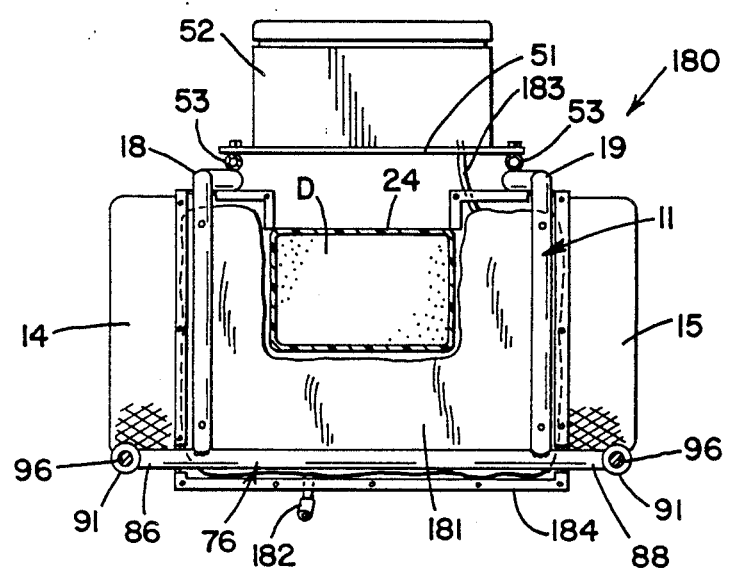

APPLICATOR AND METHOD FOR THE DELIVERY OF GRANULAR AND LIQUID PRODUCTS TO TURF AREAS

TECHNICAL FIELD

The present invention pertains to a novel and improved spreader apparatus which can deliver dry, granular fertilizer lawn treatment materials and liquid spray control products, such as herbicides, insecticides and the like in a single pass over an area of turf. Delivery of both materials is controllable and, in particular, the liquid materials are delivered in very low volume (VLV) to minimize overspray, which can be harmful to adjacent areas, and to reduce overall volume of spray material that is necessary. Moreover, the VLV application and overall system is designed to minimize operator exposure and contact with the liquid materials.

BACKGROUND OF THE INVENTION

Equipment for the dual application of granular and/or liquid lawn treatment materials has been described heretofore in the patent literature. U.S. Pat. No. 4,185,782, for instance, provides a dual purpose spreader which can dispense granular or liquid materials but not simultaneously. The spreader employs an impeller driven by the wheels and a container for the liquid material which is dispensed directly onto the impeller.

U.S. Pat. No. 4,281,780 also provides a spreader that can dispense granular or liquid materials, but not simultaneously. A liquid reservoir canister equipped with a pump is provided in the carrier. The liquid is pumped to a nozzle assembly and is distributed downwardly from the top of the hopper.

U.S. Pat. No. 4,352,463 provides a lawn treatment spreader for the simultaneous application of granular and dry materials; however, the liquid material is supplied from a tank carried by a truck, rather than by the spreader apparatus.

U.S. Pat. No. 4,483,486 provides a hand-operated apparatus for applying granular and liquid materials to lawns, both to enhance growth as well as control weeds and insects. The apparatus provides a storage compartment which includes granular storage bins and a space for a removable container for liquids. The granular material is dropped first onto a rotatable belt which is driven by the wheels and then onto a motor-driven spinner plate. The liquid material is spread by a pump which is mounted on the axle and driven by the wheels. In operation, the liquid can be fed to the outlet hose and to the nozzle, or it can be recirculated back into the reservoir by the activation of a solenoid.

Finally, U.S. Pat. No. 4,798,325 provides an apparatus and method for applying liquid and dry materials to lawns. The apparatus includes a hopper for holding the dry fertilizer materials and an impeller which is disposed beneath the hopper and rotatably driven by the wheels. The liquid treatment materials are stored in a tank which is U-shaped and fits around the front and sides of the hopper. An electric pump and motor, for pressurization of the tank are carried beneath the hopper and are powered by batteries. Nozzles are provided on a horizontal mounting bar forward of the wheels and impeller to discharge the material beneath the dry materials. Three solenoid valves are also provided for controlling the flow of fluid to the nozzles. The patent discloses that for precise trim applications, the left and right nozzles can be turned to an off position and application continued through the center nozzle.

Thus, despite the relatively recent interest in dual purpose applicators for lawn and related turf areas, an applicator has not been provided heretofore which provides a very low volume of airborne spray material to minimize drift and which provides uniform application regardless of terrain.

DISCLOSURE OF THE INVENTION

It is, therefore, an object of the present invention to provide an applicator for the controlled delivery of granular and liquid materials to turf areas.

It is another object of the present invention to provide an applicator that delivers liquid materials uniformly under low pressure and in very low volumes to minimize spray drift.

It is yet another object of the present invention to provide an applicator for the delivery of liquid materials through a plurality of nozzles which are independently controllable, both manually and automatically.

It is still another object of the present invention to provide an applicator for the delivery of liquid materials to turf areas at a preselected distance which remains relatively constant despite variations in the contour of the turf.

It is a further object of the present invention to provide a system for the treatment of lawn and turf areas and the like with granular and liquid materials which provides uniformity in the liquid compositions from the point of mixing to the area of application and little to no direct contact of the liquid materials by the operator.

It is still another object of the present invention to provide a method for uniform and simultaneous delivery of dry and liquid materials to turf areas.

In general, an applicator for the delivery of dry and liquid materials to turf areas comprises frame means supported by ground engaging wheels; hopper means carried by the frame for holding the dry materials; sealed reservoir means carried by the frame for holding the liquid materials; impeller means beneath the hopper and rotatably driven to broadcast the dry materials in an arc laterally outside of and in front of the wheels; means for selectively controlling the application of the dry materials; extendible boom means carried by the frame means; pump means for pressurizing the liquid materials to produce a low volume, low pressure spray; first nozzle means located beneath the impeller, in communication with the pump means; second nozzle means carried by the boom means in communication with the pump means; means for selectively activating the flow of liquid materials from the pump means; sensing means for independently controlling the flow of the liquid materials through the second nozzle means; and electrically operable valve means for independently controlling the flow of the liquid materials through the second nozzle means.

A method for the uniform and simultaneous delivery of dry and liquid materials to turf areas is also employed and is operable with an applicator having a frame; a hopper for the dry materials and a sealed reservoir for the liquid materials; means for broadcasting the dry materials from the hopper and first and second nozzle means for the application of the liquid materials directly to the ground. The method comprises the steps of filling the hopper with a desired dry material and the reservoir with a desired liquid material; moving the second nozzle means laterally away from the hopper and to the front of the applicator; activating a lever to commence delivery of the dry materials and the liquid materials simultaneously; selectively controlling the application of the liquid materials by moving a first switch means from a first position, in which the liquid materials are delivered continuously with the dry materials, to a second position in which delivery of the liquid materials is prohibited; and selectively activating a second switch means between on and off positions, when the first switch means is in the second position, thereby providing spot spraying of the liquid materials through the first and second nozzle means.

These and other objects, together with the advantages thereof over known applicators and related systems, which shall become apparent from the specification which follows, are accomplished by the invention as hereinafter described and claimed.

BRIEF DESCRIPTION OF THE DRAWINGS

FIG. 11 is a side elevation of an applicator depicting an alternative embodiment of liquid reservoir; and FIG. 12 is a plan view, in cross-section, taken substantially along the line 12—12 of FIG. 11.

PREFERRED EMBODIMENT FOR CARRYING OUT THE INVENTION

Figure 1:
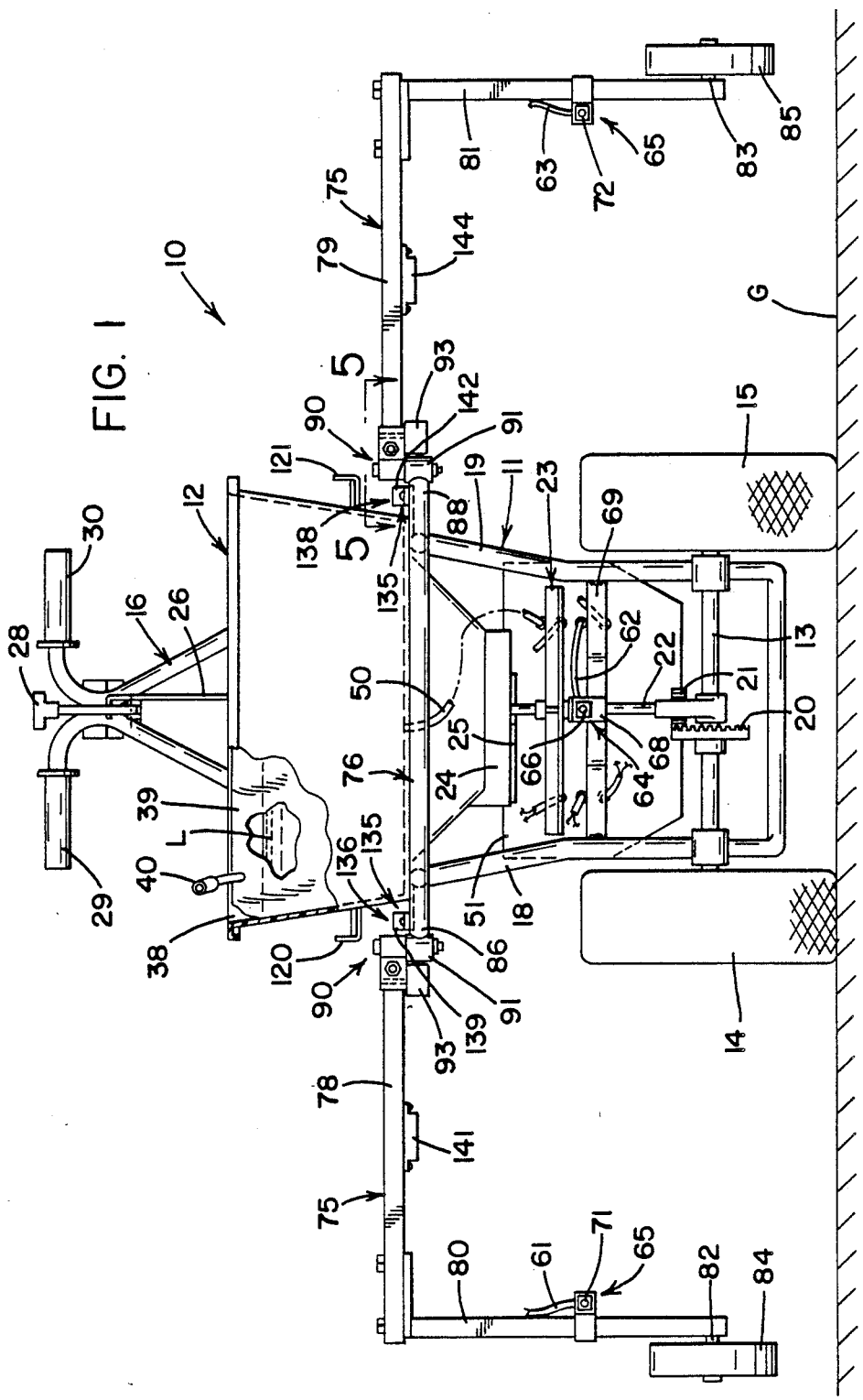
FIG. 1 is a front elevation of the applicator of the present invention.

The present invention provides an improved applicator for the accurate delivery of various granular and liquid control materials or products to ornamental turf areas. The applicator has been specifically designed to replace the tank truck spray delivery systems commonly used in residential neighborhoods and commercial establishments. These lawn services, as they are known, allow an operator to treat a turf area quickly by spraying a liquid mixture which contains a lawn fertilizer and possibly a herbicide as well as an insecticide and/or pesticide.

While such programs are in wide use today, a primary drawback is that every customer on a particular day receives the same mixture of materials or products. Although the operator may be able to customize a blend of components for the day or for a given job, this introduces a chance for error and more significantly, exposes him to direct contact with the various chemicals. Finally, the delivery of the spray by the operator is from a wand, hand held at least 24 to 30 inches from the ground and more likely, at waist height. With such delivery, the spray can and often does drift, perhaps to adjacent flowers or other ornamental plants that can be damaged by herbicides. Additionally, the operator must walk through the spray, again resulting in direct contact with the chemicals. Moreover, these chemicals can also drift onto household pets and young children, necessitating the removal of both from the area.

The applicator of the present invention overcomes these drawbacks, as will become apparent from the description which follows. Briefly stated, however, the principal advantage is that all liquid products which generally include herbicides, pesticides and the like, are delivered from a sealed system at a height of no more than 12 inches from the ground, thereby greatly minimizing spray drift. Additionally, the applicator is designed to apply very low volume (VLV) application rates of spray material, on the order of five gallons per acre. Considering an average residential yard having about 8000 square feet, the amount of liquid material applied would only be about one gallon while the conventional lawn service systems the amount employed would be about 24 to 30 gallons. Of this total amount, the volume of insecticide/pesticide products required would exceed one gallon to compensate for the higher, less efficient delivery rate. Accordingly, the applicator of the present invention uses less of these chemicals, which not only effects a cost savings but also lessens the long term effects to the ecology, considering air borne spray and rain fall run-off of the chemicals.

The liquid material is applied through a plurality of nozzles, each of which is independently controllable by the operator to alter the area treated by the spray pattern. Finally, the actual fertilizer is applied in granular form which is preferred by the operator and lawn owner alike. With the various combinations of dry and liquid materials that are available, the operator can now better treat each individual lawn area or job according to its needs rather than apply a broad spectrum of components, one or more of which may not be necessary and may even be deleterious.

With respect now to the drawings and particularly FIGS. 1-4, the applicator, indicated generally by the numeral 10, shall be described in greater detail. The applicator 10 can be adapted from a conventional granular fertilizer spreader of the cyclone type. As such it provides a frame, generally 11 which supports hopper means 12, for a supply of dry turf care product or material such as fertilizer, and carries at its lower end, an axle 13 for ground engaging wheels 14 and 15. The applicator 10 is manually propelled by means of an upright handle 16 attached to the rear members 18 and 19 of frame 11.

Axle 13 is provided with a gear 20 which meshingly engages gear 21 attached at one end of impeller shaft 22 having an impeller means 23 mounted thereon. During use, dry granular materials are released from the bottom 24 of hopper 12 and fall onto the impeller 23. A slidable plate 25, affixed to the underside of hopper bottom 24, is movable between closed, partially opened and fully opened positions to release the desired quantity of granular material which, in turn, falls onto the spinning impeller 23 and is broadcast in an arc in front of and laterally outside of wheels 14 and 15. Again, the application of granular materials in this fashion is common to existing fertilizer spreaders and, therefore, need not be described in greater detail. As is also known, a control rod 26 is mechanically linked to handle 16 to operate plate 25 manually. It provides an operating lever 28, juxtaposed between hand grips 29 and 30 of handle 16. A graduated assembly, indicated generally by the numeral 31 in FIG. 4, can also be employed for controlling the degree of openness of the hopper during application. Inasmuch as such assemblies are well known in the art, a detailed description thereof has not been provided.

Returning to the hopper 12, the interior is provided with a septum wall 35 which provides a first compartment 36 for dry granular material, indicated by the letter D, and a second compartment 38 for liquid material, indicated by the letter L. The second compartment is smaller than the first and receives a sealed reservoir means 39 which comprises a flexible polymer film bag resistant to the various fertilizers, herbicides, pesticides and the like which come into contact therewith.

Figure 9:
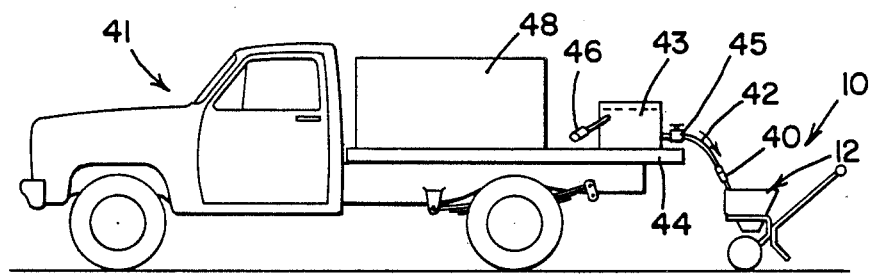
FIG. 9 is a schematic view of the applicator of the present invention being refilled from the service vehicle.

The reservoir 39 is provided with a special coupling member 40 for leakproof filling. When the operator desires to fill the reservoir 39, it is relatively simple to roll the applicator 10 over to the service vehicle 41 (FIG. 9) attach the filling line 42 from a supply tank 43 carried on the vehicle bed 44 and open the tank valve 45. When the reservoir is nearly full, the valve is closed and the line 42 is properly stored away. In this manner, the operator avoids all direct skin contact with the liquids and, he is not exposed to any vapors during the filling operation. The supply tank 43 can be filled each morning from the service building where the liquid composition can be carefully prepared and monitored. The tank 43 is also provided with a special coupling member 46 for leak proof filling at the service building. Dry materials can be carried in bulk or bags in bed 48.

Figure 8:
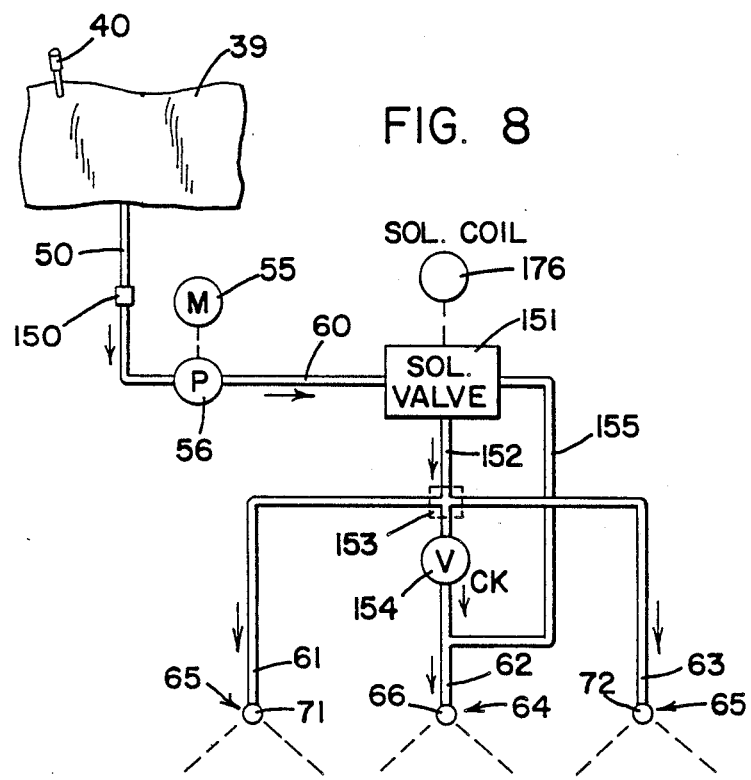
FIG. 8 is a schematic diagram of the liquid distribution system employed with the applicator.

Liquid material flows from the sealed reservoir 39 through a feed line 50 which passes through the bottom of second compartment 38 and through the back plate 51 mounted at the lower end 53 of the handle 16 for pump and motor housing 52. As is best depicted in FIG. 8, the housing 52 encloses a power supply 54, preferably a rechargeable battery; an electric motor 55 and a pump 56. The pump 56 is preferably a low pressure design unit such as is manufactured by Cole Parmer, model no. 7012-20, which provides the desired VLV application.

The liquid is fed from the pump 56 under pressure through supply line 60 which eventually feeds three individual feed lines 61, 62 and 63. Each feed line, in turn, delivers the liquid under pressure to a separate spray nozzle. With reference again to FIG. 1, it is seen that the applicator 10 is provided with first and second nozzle means, generally 64 and 65, respectively.

Nozzle means 64 includes a single spray head nozzle 66 affixed to a bracket 68 mounted on a support strut 69 from the frame 11. It is located beneath impeller 23 and generally in a vertical plane passing through the forwardmost edge 70 of impeller 23 and the vertical tangent of the leading edge of wheels 14 and 15. Vertically, the nozzle 64 is positioned at approximately the height of wheels 14 and 15 so that the spray is delivered from a point relatively close to the ground G. Although the location of the nozzle 64 can be varied somewhat, it should be lower than the impeller 23 so that the spray is not required to pass through the dry materials and it should be toward the front of the applicator 10 so that the spray travels unimpeded to the ground.

Nozzle means 65 includes left and right spray head nozzles, 71 and 72, respectively, each communicating with a feed line, 61 and 63, respectively. The nozzles 71 and 72 are located on extendible boom means 75 which are carried by and articulate with a rigid mounting bar 76 which forms the front of frame 11, beneath the hopper 12.

Boom means 75 includes left and right horizontally extending arms, 78 and 79, respectively. Affixed to the outboard end of each arm is a vertical strut member, 80 and 81. Strut member 80 carries spray nozzle 71 and strut member 81 carries spray nozzle 72, both nozzles desirably mounted in a plane with first nozzle means 64, parallel to the ground. At the end of each strut member an axle 82, 83 and wheel 84, 85 is provided as depicted in the drawings. Wheels 84 and 85 are smaller than wheels 14 and 15 and do not contact the ground when the applicator is in use over level ground, the purpose of which will be discussed hereinbelow.

Figure 5:
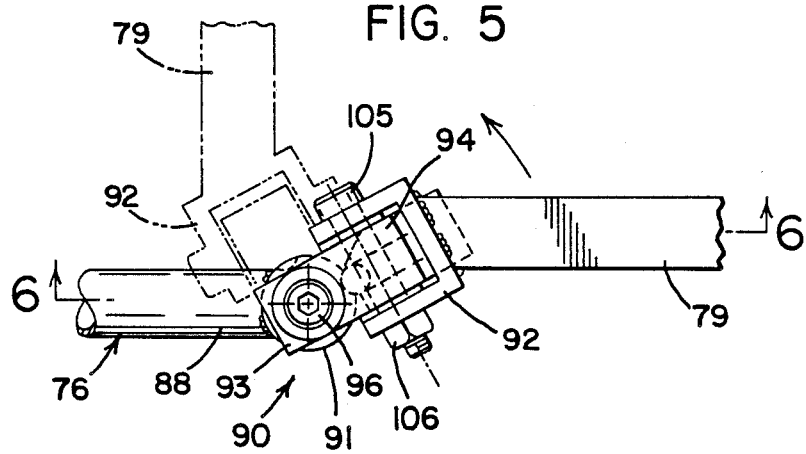
FIG. 5 is an enlarged top plan view, taken substantially along the line 5—5 of FIG. 1, depicting the joint assembly of one outboard spray nozzle boom.
Figure 6:
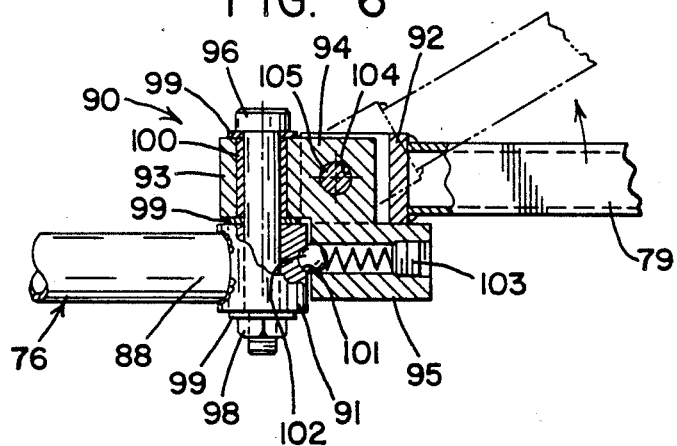
FIG. 6 is a cross-section, taken substantially along the line 6—6 of FIG. 5, depicting the joint assembly.

The arms 78 and 79 are affixed to the ends 86 and 88 of mounting bar 76 by a special joint assembly 90, depicted in greater detail in FIGS. 5 and 6. Inasmuch as the joint assemblies 90 for arms 78 and 79 are identical, only the right hand side need be described. Joint assembly 90 includes a cylindrical base 91, affixed to the end of mounting bar 76, a bracket 92, affixed to the end of arm 79, which is, in turn, pivotally connected to a rotatable knuckle joint 93 itself having an upper member 94, that is supported by the base 91, and a lower member 95 that is rotatable about the base 91 throughout at least 90°. Both base 91 and knuckle joint 93 are provided with a mating bore therethrough and are assembled together with a bolt 96 and nut 98 including washers 99 and sleeves 100 so that arm 79 is freely rotatable, with respect to mounting bar 76, in a horizontal plane.

Base 91 is provided with a detent 101 along its outer circumference for receipt of a spring biased ball 102 held in place by a cap screw 103. In this manner, the arm 79 can be locked in a fully laterally extended position, depicted in FIGS. 1, 3, 4 and 5 or it can be rotated approximately 90° in a horizontal plane, toward the frame 11 for storage as depicted in phantom in FIGS. 2 and 5. Rotation is also permitted when the arm 79 or strut 81 encounters an obstacle.

The arm 79 is also rotatable in a vertical plane with respect to mounting bar 76. A bore 104 is provided in upper member 94 of knuckle 93 passing horizontally therethrough. Mating bores in bracket 92 allow for the passage of a second bolt 105 to affix bracket 92 and arm 79 to upper member 94 which is held in place with nut 106. The articulation between bracket 92 and knuckle joint 93 allows the arm 79 to pivot vertically, in a counterclockwise fashion with respect to the end of mounting bar 76, as depicted in phantom in FIG. 6. In similar fashion the articulation between bracket 92, affixed to the left arm 78, with respect to knuckle member 93 allows the left arm to pivot vertically in a clockwise fashion with respect to the other end of mounting bar 76. Similarly, left arm 78 is horizontally rotatable about mounting bar 76, toward the frame 11.

Figure 3:
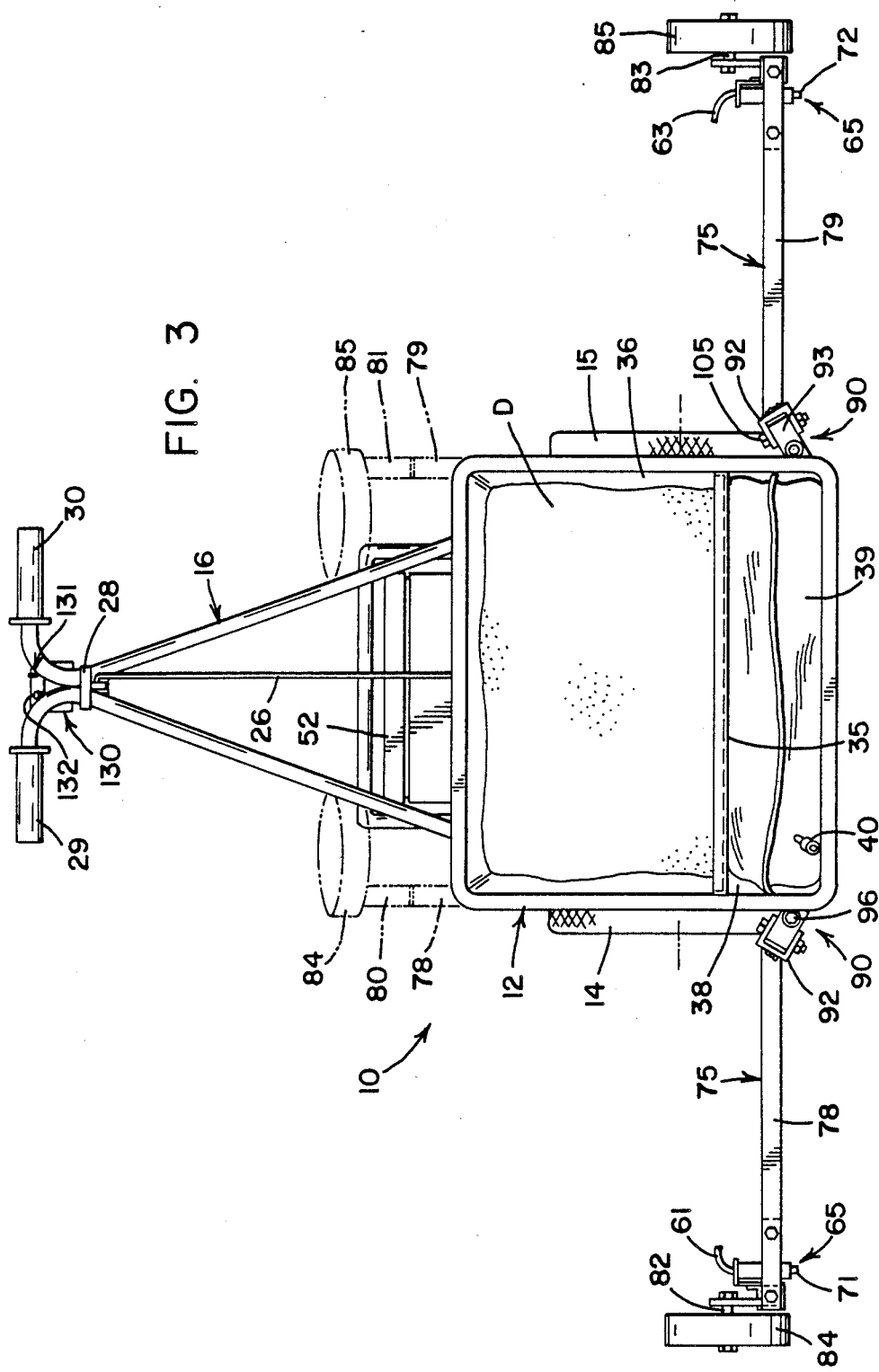
FIG. 3 is a top plan view of the applicator of the present invention.

Horizontal rotation of the arms 78 and 79 first allows the boom means 75 to be stored away, as depicted in phantom in FIG. 3 during movement between job sites as well as when it is not desired to spray liquid through second nozzle means 65. Another feature of this design is that either arm of boom means 75 provides breakaway movement as, for instance, where the arm 78 or 79 might strike a tree, post, rock, building wall or other obstacle. Once adequate clearance is again available the operator can readily re-extend the arm by rotation until the ball 102 and detent 101 are engaged.

Figure 7A:
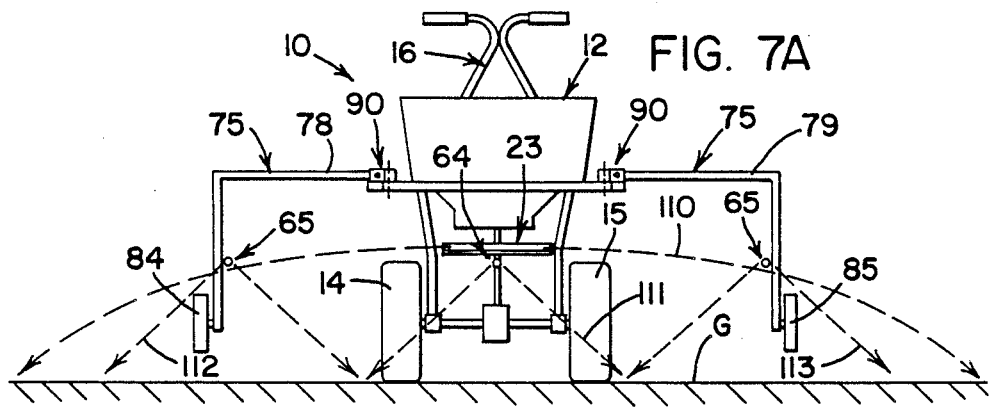
FIGS. 7A-C depict the applicator of the present invention schematically as it would apply dry and liquid materials over different land topographies.
Figure 7B:
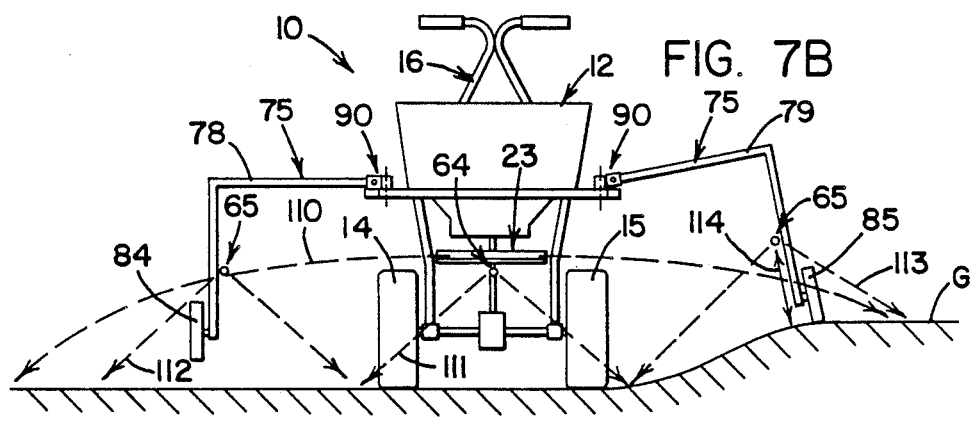
Figure 7C:
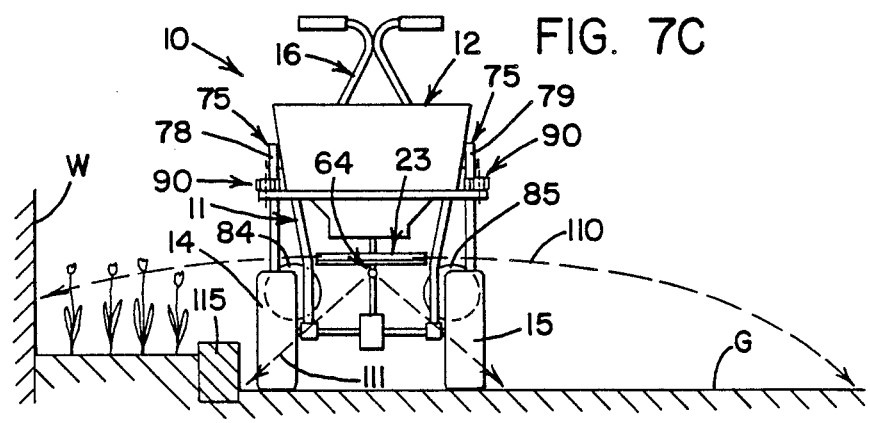

Various operating modes are readily depicted in FIGS. 7A-7C to which reference should be made. In FIG. 7A, the boom means 75 are first extended and the applicator 10 is shown broadcasting dry granular material, arc 110 and simultaneously applying liquid material via first nozzle and second nozzle means 64 and 65. First nozzle means 64 provides a control spray cone 111 which extends slightly past the outer edges of wheels 14 and 15. Meanwhile, second nozzle means 65, comprising spray nozzles 71 and 72, provides lateral spray cones 112 and 113, respectively.

In FIG. 7B a small rise in the ground toward the right side of the drawing is depicted. Guide wheel 85 contacts the rise, riding up with vertical rotation of right arm 79. In this manner, spray cone 113 is delivered at a minimum distance 114 from the ground. Again the articulation allowed by knuckle joint 93 permits application to continue in an uninterrupted fashion without damaging the boom means 75 or requiring the operator to alter his course.

Finally, in FIG. 7C, the applicator 10 has been moved adjacent to a flower bed encompassed between a retaining member 115, such as a railroad tie, and a building wall W. Because the herbicide containing spray cone 112 from nozzle 71 would be harmful to the flowers, the boom means 75 are rotated rearwardly toward the frame 11 in stored position with the simultaneous shutting off of spray cones 112 and 113, as will be described next.

Figure 2:
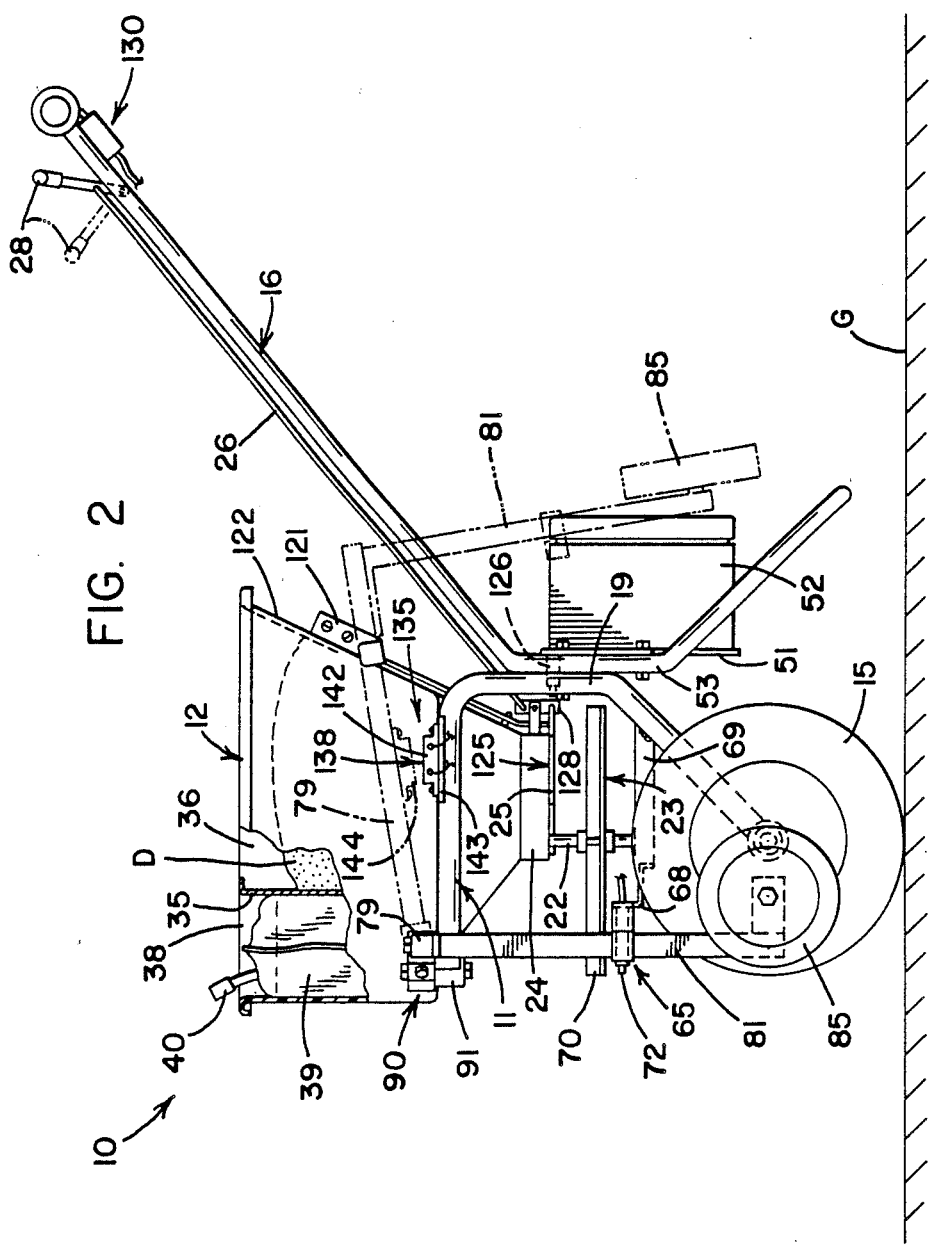
FIG. 2 is a side elevation of the applicator of the present invention.
Figure 4:
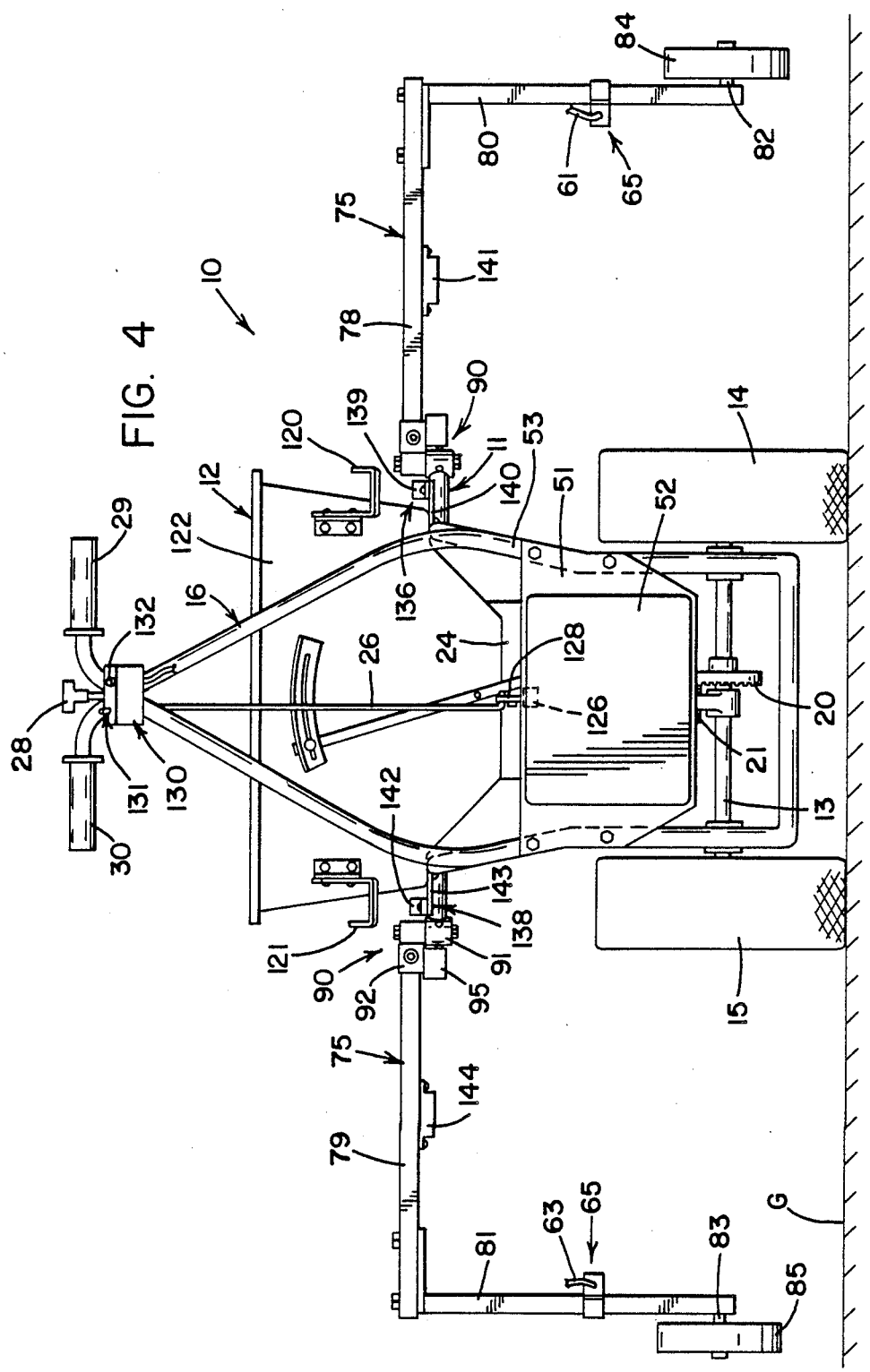
FIG. 4 is a rear elevation of the applicator of the present invention.

As most clearly depicted in FIGS. 2 and 4, a pair of hanger brackets 120 and 121 are affixed to the outside rear wall 122 of hopper 12. Each bracket is positioned to receive one of the arms 78, 79 of boom means 75, providing a retracted position therefor, depicted in phantom in FIGS. 2 and 3. The retracted position is provided for two purposes. First, is to make the applicator 10 compact during periods of non-use such as movement on the service vehicle 41 and also for storage. The second purpose is during use in those instances where the operator does not have adequate clearance to maneuver the applicator (FIG. 7C) as well as where the delivery of liquid spray is not required.

In conjunction with the required application of materials, the applicator of the present invention provides a unique control system. One component of the system is the means for selectively controlling the application of dry materials, indicated generally by the numeral 125. Means for controlling 125 includes operating lever 28, and the related control rod 26 and slidable plate 25. Movement of the lever forward, opens the hopper 12 and allows dry material D to fall onto the impeller 23, as previously described, while pulling back on the lever closes the hopper, shutting of the flow of dry material.

Movement of lever 28 also throws a switch 126 which starts the pump motor 55. The switch 126 is provided in the back plate 51 and is activated by a short lever arm 128 carried by the control rod 26, as is depicted in FIG. 2. Switch 126 is, in turn, a component of the means for selectively activating the flow of liquid materials, which is indicated generally by the numeral 130. Means for activating 130 also includes a three position electrical switch 131 and a separate push on/push off button 132 for intermediate use.

In normal use of the applicator 10, boom means 75 have been extended, dry and liquid materials have been loaded and the operator is ready to commence application. By advancing lever 28 forward, dry material is dispensed from the hopper and liquid material is dispensed through nozzle means 64 and 65. The operator also begins walking and pushing the applicator 10 to treat the ground, as depicted in FIG. 7A. Should the operator desire to apply only dry material, movement of switch 131 from the first to the second position turns off the motor 55 and spraying of the liquid material ceases. In the third position, the spray is also off; however, should the operator note an area that needs treatment, he can push in button 132 which supplies power to the motor and commences spraying until the button 132 is again pushed which turns off the motor.

The applicator 10 also includes sensing means, indicated generally by the numeral 135 which independently control the flow of liquid materials through the second nozzle means 65. Sensing means 135 comprise a pair of magnetic switches 136 and 138, one for each arm 78 and 79, respectively, of boom means 75. Switch 136 includes a sensor 139 which is affixed to a horizontal member 140 (FIG. 4) of the frame 11, and a source 141 carried by the arm 78. In similar fashion, switch 138 includes a sensor 142 affixed to the opposite horizontal member 143 of frame 11 and a source 144 carried by the arm 79. It is to be understood that while magnetic switches have been disclosed, other types of proximity switches or contact switches could be substituted therefor.

Whenever the arms 78 and 79 are in their extended positions sensing means 135 provide a closed circuit and liquid is pumped to the nozzles 71 and 72. However, when both arms 78 and 79 are retracted or moved to their stored position, switches 136 and 138 interrupt the circuit, as a result of which, neither nozzle 71 nor 72 is fed liquid, and only nozzle 66 can spray. The circuitry can also employ a rheostat which reduces the speed of motor 55 when both switches 136 and 138 are closed, thereby reducing the volume of liquid that is pumped to the primary nozzle means 64.

With reference to FIG. 8, the piping or lines between the liquid reservoir 39 and the nozzles will be described. Feed line 50 passes through a filter 150 to the inlet side of pump 56. Supply line 60, from the pump flows into a solenoid valve 151 which is normally closed in which instance liquid exits via line 152 to a four-way fitting 153 from which the individual lines 61, 62 and 63 are provided to spray nozzles 71, 66 and 72, respectively. Line 62 flows through a one-way check valve 154 which allows fluid flow only toward the nozzle 66.

In the event that the arms 78, 79 of boom means 75 have been retracted, solenoid valve 151 is activated, in response to sensor means 135, and liquid is then directed only through line 155 which is connected directly to line 62. Liquid entering line 62 is blocked from flowing to the four-way fitting 153 by check valve 154 and, therefore, it flows only to the nozzle 66 and not secondary nozzle means 65.

Figure 10:
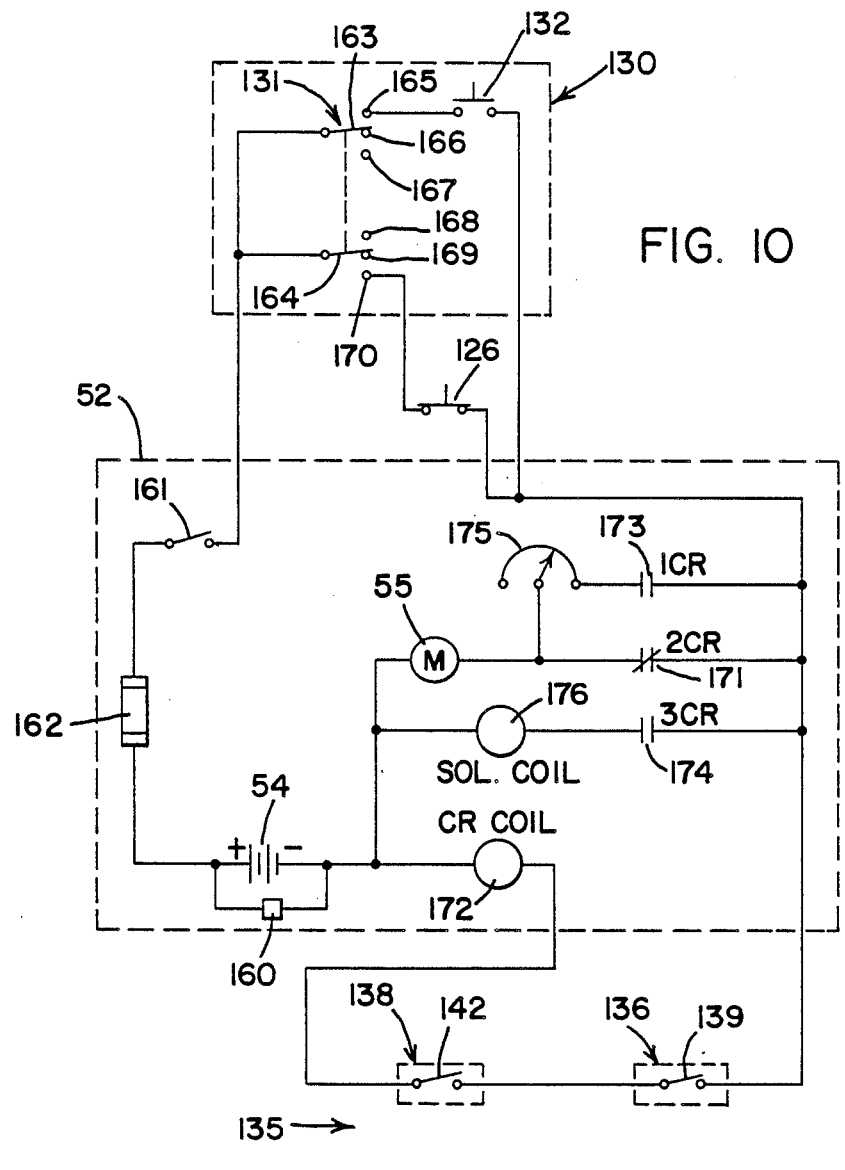
FIG. 10 is a schematic wiring diagram of the applicator.

With reference next to FIG. 10, the wiring and electrical components of the applicator 10 shall be described. As previously noted, the applicator provides a pump and motor housing 52 and means for selectively activating the flow of liquid materials, 130. Within the housing 52 is a battery power supply 54 which can optionally be rechargeable, in which instance a receptacle 160 can be provided to connect to a charging unit. A master switch 161 is provided on the exterior of housing 52 to cut off all power to the pump motor 55 and related components. This switch can be key-operated, if desired, as an added safety measure. A fuse 162 can also be employed between the battery and switch 161. Current next flows to three-position switch 131 which is of a double-pole type, having blades 163 and 164 and three contacts, 165, 166, 167 for blade 163 and three contacts 168, 169, 170 for blade 164.

Switch 131 is depicted in the neutral or second of its three positions. Blades 163 and 164 connect with contacts 166 and 169 respectively and, therefore, no current flows to the pump motor 55. In this position, no liquid is delivered, while dry material may, depending upon the position of lever 28. By moving switch 131 to the right, blade 164 connects with contact 170 to complete a circuit through switch 126 and activate the pump as discussed hereinabove. This is the normal operating mode for the simultaneous application of liquid and dry materials.

Switch 131 can also be moved to the left position from neutral which is spray on/spray off, discussed hereinabove. Blade 163 now connects with contact 165 to complete a circuit. Blade 164 connects with contact 168 concurrently, but no circuit is completed. Thus, the liquid material is normally not pumped to the nozzles when on/off button 132 is opened (as depicted). When in the closed state, current flows into the housing, through a normally closed contact 171 and to the pump motor 55 and as a result liquid is fed to all of the nozzles. If the operating lever has been moved forward, granular material is normally dispensed and thus, the operator has continuous dry material and liquid on demand.

With reference to the sensing means 135, both magnetic or interlock switches 136 and 138 are opened, as depicted, when the boom arms 78, 79 are extended and thus, liquid is directed through first and second nozzle means. In the event that the arms are retracted, switches 136 and 138 close, sending current to a control relay coil 172 which instantaneously switches normally closed contact 171 and normally open contacts 173 and 174 to opposite positions. This, in turn, causes the direct power to pump motor 55 to stop while a reduced power flows through rheostat 175 to the motor 55 which results in a decreased volume of output from pump 56. Current also now flows through contact 174, energizing solenoid coil 176 of solenoid valve 151, which directs liquid only to the first, center nozzle 66.

Thus, as described hereinabove, when the operator wishes to retract the boom arms, spray to both secondary nozzles is stopped. Of course, to do so conveniently and safely, the operator must first stop the applicator 10 in which instance, the lever 28 would be retracted, closing the flow of granular material and opening switch 126 to shut off the pump motor 55. Then, as both boom arms are retracted to the stored position, switches 136, 138 are closed to insure that spray will not flow from the secondary nozzles.

While not shown, the circuitry could be altered by wiring switches 136 and 138 in parallel in which instance, movement of either arm 78 or 79 to the retracted or stored position would interrupt the circuitry to the pump and energize the solenoid coil 176 such that liquid would only be directed to the center nozzle 66. As should also be appreciated, the circuitry and valving could be further modified to provide for the individual shutting off of the liquid to spray nozzle 71 or 72 in response to retraction of the respective horizontal arm, 78 or 79.

While also not shown, each of the nozzles are equipped with a diaphragm valve or the like to eliminate any drippage of fluid from the lines 61, 62 or 63 when not in use. Another useful feature may be to add a multifunctional LED device which could monitor distance, in fact, yards, miles or the like; current speed of application; time for hours running; volume of liquid sprayed or remaining and a beat or tempo signal which would allow the operator to pace himself at a correct walking speed. Such devices are known and, therefore, need not be shown or described in greater detail.

An alternative embodiment of the present invention includes an applicator that provides a different liquid reservoir. With reference to FIGS. 11 and 12, the applicator, indicated generally by the numeral 180, is depicted which is substantially the same as the applicator 10 except for the sealed reservoir means 181. Reservoir means 181 can comprise a flexible polymer bag, similar to reservoir 39, which is resistant to fertilizers, herbicides, pesticides, insecticides and the like. It is provided with a leakproof coupling member 182 and a feed line 183 to the pump 56.

The reservoir 181 can be carried within a rigid or semi-rigid e.g., flexible, tank shell member 184 that is mounted in a suitable manner to frame 11 beneath hopper means 12. The tank shell 184 is generally U-shaped, as depicted in FIG. 12, to fit around hopper bottom 24 and otherwise conform to the lower hopper exterior. The advantage of carrying the reservoir means 181 underneath the hopper is that it lowers the center of gravity, increasing the maneuverability of applicator 180. Also, the hopper does not require the septum wall 35, which increases its capacity for dry materials. Of course, if desired, the tank shell member 184 could be dispensed with and the reservoir means 181 could be mounted directly to the frame 11, beneath and around the hopper, as described hereinabove. The reservoir need not comprise a flexible bag and could take the form of a rigid container being fabricated from a plastic or a suitable metal. If a rigid container is selected, then a one-way valve or vent should be employed to equalize pressure as the liquid is withdrawn. Such a rigid container, suitably configured, could also be provided as the reservoir 39 for use in the applicator 10.

Having concluded the detailed description of the applicator 10, the method of the present invention may now be considered. To begin, the operator loads onto the service truck the various dry, granular fertilizers and related materials that are to be applied for the day and he fills the tank 43 with the desired mixture of liquid materials. The applicator 10 is loaded onto the truck and the operator then travels to the first job site. Owing to the compact size of the applicator, with the boom arms retracted, and the nominal weight, the applicator can readily be loaded and unloaded by one operator. Of course, the truck could also be provided with a ramp or lift to facilitate movement on and off of the truck.

At the job site, the applicator is unloaded and the hopper 12 and liquid reservoir 39, or 181, are filled. The operator then extends the boom means 75, unlocks the circuitry via switch 161, moves the three position switch 131 to the dry and spray position, advances the operating lever 28 and begins walking, pushing the applicator in front of him. Whenever it is necessary to stop movement, to change directions, retract the boom arms or refill, pulling back on the lever 28 immediately halts the delivery of dry and liquid materials. As described hereinabove, for confined areas or areas where lateral spray is not required, the boom arms can be retracted, with the lever 28 in the closed position, and when application is again commenced, only the center nozzle will emit liquid spray. Finally, by moving the switch 131 to the spray on demand position, the operator can momentarily add liquid spray, while delivering dry materials, through only the first nozzle 64, or through nozzle 64 and lateral nozzles 71 and 72.

Thus, it should be evident that the applicator of the present invention provides a highly effective means for delivering granular and liquid materials to turf areas. The applicator provides a minimal amount of airborne spray particles which helps to protect the environment, is safer to the operator as well as neighboring plants and animals and, is not wasteful of chemical materials utilized in the treatment of turf areas. Moreover, the design of the system provides a highly maneuverable apparatus and at the same time, one which can cover large areas of turf in a single pass applying both dry and liquid materials, as well as dry alone or dry with intermittent liquid.

Based upon the foregoing disclosure, it should now be apparent that the use of the applicator described herein will carry out the objects set forth hereinabove. It should also be apparent to those skilled in the art that the applicator of the subject invention can readily be utilized in conjunction with various types of dry and liquid materials thereby affording the operator and lawn service greater flexibility in meeting the needs of a variety of customers and turf situations.

It is, therefore, to be understood that any variations evident fall within the scope of the claimed invention and thus, the selection of specific component elements can be determined without departing from the spirit of the invention herein disclosed and described. Moreover, the scope of the invention shall include all modifications and variations that may fall within the scope of the attached claims.

We claim:

1. An applicator for the delivery of dry and liquid materials to turf areas comprising:
    frame means supported by ground engaging wheels;
    hopper means carried by said frame for holding said dry materials;
    sealed reservoir means carried by said frame for holding said liquid materials;
    impeller means beneath said hopper and rotatably driven to broadcast said dry materials in an arc laterally outside of and in front of said wheels;
    means for selectively controlling the application of said dry materials;
    extendible boom means carried by said frame means, said extendible boom means movable between a use and a stored position;
    pump means for pressurizing said liquid materials to produce a low volume, low pressure spray;
    first nozzle means located beneath said impeller, in communication with said pump means;
    second nozzle means carried by said boom means in communication with said pump means;
    means for selectively activating the flow of liquid materials from said pump means;
    sensing means for sensing the position of the boom means between said use and stored positions and independently terminating the flow of liquid materials to said second nozzle means when said boom means are in said stored position;
    electrically operable valve means for controlling the flow of said liquid materials through said second nozzle means independently of said first nozzle means and said application of dry material.

2. An applicator, as set forth in claim 1, wherein said frame means has opposite lateral ends, said extendible boom means comprises a pair of horizontal arm members, forwardly rotatable about the ends of said frame means by joint means to an extended position beneath said hopper and rearwardly rotatable to a stored position generally parallel to the sides of said hopper.

3. An applicator, as set forth in claim 2, wherein each said arm member carries a strut member extending downwardly from the outboard end thereof.

4. An applicator, as set forth in claim 3, wherein said strut member carries a ground engageable wheel at its lower end, said wheel remaining away from the ground when the area between said ground engaging wheels and said ground engageable wheel is fairly level.

5. An applicator, as set forth in claim 4, wherein
    said joint means are interposed between said extendible boom means and said ends of said frame means allowing rotational movement of each said arm member in a horizontal plane and a vertical plane with respect to said ends of said frame means, whereby said ground engageable wheels can raise said arm member with respect to said hopper upon engagement with a ground contour higher than the ground beneath said ground engaging wheels.

6. An applicator, as set forth in claim 5, wherein said joint means provides a locked position in which said arm members are normally fully extended and an unlocked position when said arm members are partially extended.

7. An applicator, as set forth in claim 3, wherein said second nozzle means comprise a pair of spray nozzles, each said nozzle being mounted on one of said downwardly extending strut members.

8. An applicator, as set forth in claim 7, wherein said first nozzle means comprises a single spray nozzle, said single spray nozzle being carried in a horizontal plane passing through said pair of spray nozzles.

9. An applicator, as set forth in claim 2, wherein said sensing means comprise a pair of proximity switches, each said switch having a sensor component and a source component, said sensor component being carried by said frame member and said source component being affixed to said horizontal arm member in a position to activate said sensor component when said arm members are in the stored position.

10. An applicator, as set forth in claim 1, wherein said means for selectively activating the flow of liquid materials from said pump means comprises first and second switch means, said first switch means providing
    a first position wherein said pump means is continuously activated; and
    a second position wherein said pump means is activated intermittently in response to the state of said second switch means between on and off positions thereby providing spot spraying of said liquid materials through at least said first nozzle means.

11. An applicator, as set forth in claim 10, wherein said spot spraying also occurs through said secondary nozzle means.

12. An applicator, as set forth in claim 10, wherein said means for selectively controlling the application of said dry materials includes linkage means allowing the operator to open and close said hopper means manually, said linkage means operably engaging a switch for simultaneously starting said pump means with the opening of said hopper means when said first switch means is in said first position.

13. An applicator, as set forth in claim 1, wherein said electrically operable valve means comprises a solenoid valve normally open to said first and second nozzle means and closable to said second nozzle means in response to the position of said extendible boom means.

14. An applicator, as set forth in claim 1, wherein said hopper means carries a septum member providing first and second compartments.

15. An applicator, as set forth in claim 14, wherein said sealed reservoir means is located in one of said compartments.

16. An applicator, as set forth in claim 15, wherein said sealed reservoir means comprises a collapsible, sealed polymeric bag providing a coupling member, normally closed to the atmosphere, for refilling said bag and a supply line connected to said pump means.

17. An applicator, as set forth in claim 1, wherein said sealed reservoir means is carried outside of and beneath said hopper means.

18. An applicator, as set forth in claim 17, wherein said applicator further includes
    a generally U-shaped tank shell connected, to said frame means and mounted beneath said hopper means for carrying said sealed reservoir means.

19. An applicator, as set forth in claim 18, wherein said sealed reservoir means comprises a collapsible, sealed polymeric bag carried within said tank shell, providing a coupling number, normally closed to the atmosphere, for refilling said bag and a supply line connected to said pump means.

20. An applicator, as set forth in claim 1, wherein said pump means is operated by an electric motor, said applicator further comprising:
    means for reducing the speed of said motor and the output of said pump means when said liquid materials is emitted solely from said first nozzle means.

21. A method for the uniform and simultaneous delivery of dry and liquid materials to turf areas employing an applicator having a hopper for said dry materials and a sealed reservoir for said liquid materials; means for broadcasting said dry materials from said hopper and first and second nozzle means for the application of said liquid materials directly to the ground, said second nozzle means being mounted to extendible boom means, said method comprising the steps of:
    filling the hopper with desired dry materials and the reservoir with desired liquid materials;
    moving said second nozzle means laterally away from the hopper and to the front of the applicator;
    activating a lever to commence delivery of the dry materials and the liquid materials simultaneously;
    selectively controlling the application of the liquid materials by moving a first switch means from a first position, in which the liquid materials are delivered continuously with the dry materials, to a second position in which delivery of the liquid materials is prohibited; and
    selectively activating a second switch means between on and off positions, when said first switch means is in said second position, thereby providing spot spraying of the liquid materials through said first and second nozzle means.

22. A method, as set forth in claim 21, wherein said second nozzle means comprises a pair of spray nozzles, each said nozzle being carried by said extendible boom means pivotally mounted to the frame, and wherein said step of moving includes rotating said boom means with respect to the frame to an extended position, generally to the left and right sides of the applicator.

23. A method, as set forth in claim 22, including the additional step of retracting said boom means thereby automatically terminating the flow of the liquid materials to said second nozzle means.

24. A method, as set forth in claim 21, including the additional step of raising and lowering said boom means to conform with changes of the ground elevation.

25. A method, as set forth in claim 24, wherein said boom means further include ground engageable wheels which contact the ground during said step of raising and lowering.

* * * * *